US012649523B2

(12) United States Patent　(10) Patent No.:　US 12,649,523 B2

Nagasawa　(45) Date of Patent:　Jun. 9, 2026

(54) VEHICLE BODY FRONT PART STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 302 days.

(21) Appl. No.: 18/585,411

(22) Filed: Feb. 23, 2024

(65) Prior Publication Data

US 2024/0300581 A1　Sep. 12, 2024

(30) Foreign Application Priority Data

Mar. 10, 2023　(JP) ................................. 2023-037021

(51) Int. Cl.
 B62D 21/15　(2006.01)
 B62D 25/08　(2006.01)

(52) U.S. Cl.
 CPC ......... B62D 21/152 (2013.01); B62D 25/084 (2013.01)

(58) Field of Classification Search
 CPC ............................ B62D 25/082; B62D 25/085
 See application file for complete search history.

(56) References Cited

U.S. PATENT DOCUMENTS

| | | | | |
|---|---|---|---|---|
| 2022/0306206 A1* | 9/2022 | Kim | ........................ | B62D 25/08 |
| 2023/0415817 A1* | 12/2023 | Nagasawa | ............ | B62D 21/152 |
| 2024/0239415 A1* | 7/2024 | Zhao | ........................ | B60R 19/18 |
| 2024/0308594 A1* | 9/2024 | Nagasawa | ............ | B62D 25/085 |

FOREIGN PATENT DOCUMENTS

| | | | | | |
|---|---|---|---|---|---|
| CN | 114954676 A | * | 8/2022 | ............. | B62D 25/08 |
| CN | 118529152 A | * | 8/2024 | ............ | B60L 3/0007 |
| CN | 118618493 A | * | 9/2024 | ........... | B62D 25/084 |
| JP | 2006/290224 A | | 10/2006 | | |
| WO | WO-2023125664 A1 | * | 7/2023 | ............. | B60R 19/18 |

* cited by examiner

*Primary Examiner* — Patricia L Engle

(74) *Attorney, Agent, or Firm* — Smith, Gambrell & Russell, LLP

(57) ABSTRACT

A vehicle body front part structure includes: a radiator panel frame, front side frames; an inverter unit; a front cross member extending in the vehicle width direction ahead of the inverter unit; upper frame reinforcing members in a pair extending in a vehicle longitudinal direction on an upper side of the vehicle; and radiator panel reinforcing members forming a V shape pointing in the vehicle longitudinal direction. In each radiator panel reinforcing member, an apex is joined to an outer part of an upper end of the radiator panel frame; a rear end of an upper side member is joined to a front side part of a bent part of the upper frame reinforcing member; and a rear end of a lower side member is joined to an upper surface of the front side frame ahead of a joint part joining the front cross member and the front side frame.

4 Claims, 6 Drawing Sheets

VEHICLE BODY FRONT PART STRUCTURE

CROSS-REFERENCE TO RELATED APPLICATIONS

The present application claims priority from Japanese Patent Application No. 2023-037021 filed on Mar. 10, 2023, the entire contents of which are hereby incorporated by reference.

BACKGROUND

The disclosure relates to a vehicle body front part structure.

Typically, in a frontal collision of a vehicle, preventing deformation of a cabin, which is an occupant boarding space, is an effective way to reduce injury to an occupant, and various measures are taken for this purpose. In recent years, a structure for absorbing collision energy in front of the cabin has been widely used.

When considering frontal collisions of vehicles, multiple types of collision, such as a full-overlap collision in which the whole surface of a vehicle in the vehicle traveling direction collides with an object, an offset collision or small-overlap collision in which one side of a vehicle in the vehicle traveling direction collides with an object, and an under-ride collision in which the upper side of a vehicle in the vehicle traveling direction collides with an object are taken into consideration.

In a vehicle such as a hybrid vehicle or an electric vehicle, an inverter unit for converting a DC voltage into an AC voltage to drive an electric motor may be mounted in the front of the vehicle.

The inverter unit generates a high voltage necessary for traveling of the vehicle. Hence, if the inverter unit is deformed or disconnected due to a frontal collision or the like of the vehicle, a sudden abnormal reaction may occur.

Hence, there has been a demand for a vehicle body front part structure that absorbs collision energy to prevent damage to the inverter unit in any collision type.

In response to this demand, Japanese Unexamined Patent Application Publication (JP-A) No. 2006-290224 has proposed a structure in which each of ends of a front bumper reinforcement in the longitudinal direction thereof is coupled to an upper member, a radiator support upper, a front side member, and a radiator support lower via a coupling body including first to fourth coupling members formed as a single component. In a small-overlap collision, in which an object collides with an end of the front bumper reinforcement in the longitudinal direction thereof, this structure supports the end, transmits a collision load to a body side, and absorbs the energy.

SUMMARY

An aspect of the disclosure provides a vehicle body front part structure provided in front of a cabin configured to accommodate one or more occupants in a vehicle. The vehicle body front part structure includes a radiator panel frame, front side frames in a pair, an inverter unit, a front cross member, upper frame reinforcing members in a pair, and radiator panel reinforcing members. The radiator panel frame forms a framework extending in a vehicle width direction and a vehicle vertical direction of the vehicle at a front side of the vehicle. The front side frames extend in a vehicle longitudinal direction of the vehicle, on both sides in the vehicle width direction, on a lower side of the vehicle.

The front side frames each include a front end joined to the radiator panel frame. The inverter unit is disposed between the front side frames in the vehicle width direction and is configured to generate a voltage to be supplied to a vehicle driving motor of the vehicle. The front cross member extends in the vehicle width direction in front of the inverter unit and includes both ends joined to the front side frames in the vehicle width direction. The upper frame reinforcing members extend in the vehicle longitudinal direction, on both sides in the vehicle width direction, on an upper side of the vehicle. The upper frame reinforcing members each include a bent part downward toward the front side of the vehicle at a position behind the front cross member. The upper frame reinforcing members each include a lower front end joined to an outside part of a joint part in the vehicle width direction. The joint part joins the front cross member and a corresponding one of the front side frame. The radiator panel reinforcing members each include an upper side member and a lower side members that are joined together at an apex to form a V shape pointing in the vehicle longitudinal direction. The apex is disposed on the front side of the vehicle. An upper end of the radiator panel frame includes an outer part joined to the apex in the vehicle width direction. A rear end of the upper side member is joined to a front side part of the bent part of a corresponding one of the upper frame reinforcing members. The lower side member includes a rear end joined to an upper surface of the corresponding one of the front side frames, at a position in front of the joint part.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 2A to 2C are schematic views of the vehicle body front part structure illustrated in FIG. 1 without front wheels and strut towers, in which FIG. 2A is a plan view as viewed from above the vehicle, FIG. 2B is a side view, and FIG. 2C is a front view as viewed from the vehicle traveling direction;

FIGS. 3A to 3C are schematic views of an object to collide with the front side of the vehicle body front part structure, as viewed from the front side of the vehicle, in which FIG. 3A illustrates the object at the time of a full-overlap collision, FIG. 3B illustrates the object at the time of a small-overlap collision, and FIG. 3C illustrates the object at the time of an under-ride collision;

DETAILED DESCRIPTION

Figure 1:
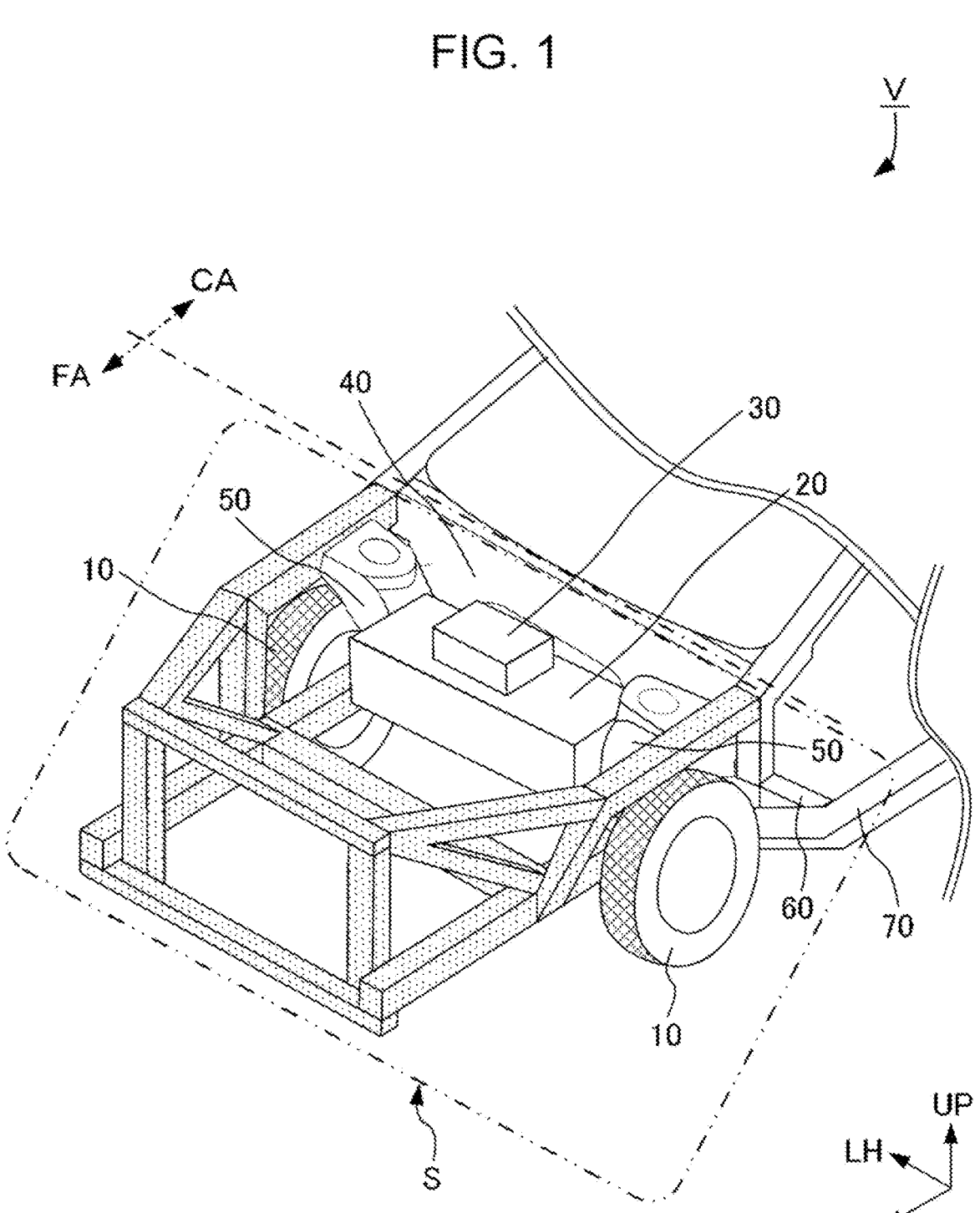
FIG. 1 is a perspective view of a vehicle body front part structure according to an embodiment of the disclosure as viewed from above.

The technique disclosed in JP-A No. 2006-290224 does not consider a full-overlap collision or an under-ride collision, and thus, there is a problem in that the inverter unit may be deformed when a full-overlap collision or an under-ride collision occurs at the front side of the vehicle.

It is desirable to provide a vehicle body front part structure that prevents deformation of the inverter unit in multiple types of frontal collision.

A vehicle V having a vehicle body front part structure S (hereinbelow, a front part structure S) according to an embodiment of the disclosure will be described with reference to FIGS. 1 to 6. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that arrows FR, UP, and LH in the drawings indicate the traveling direction of the vehicle V illustrated in FIG. 1, the upper side of the vehicle V, and the left side of the vehicle V as viewed from the vehicle traveling direction, respectively. In the following description, unless otherwise specified, a vertical (top-bottom) direction and a lateral (left-right) direction are directions as viewed from the vehicle traveling direction, and a longitudinal (front-rear) direction is a direction in which the vehicle traveling direction is the front side.

EMBODIMENT

The structure of the front part structure S according to this embodiment, provided in the vehicle V, will be described with reference to FIGS. 1 to 6.

The description is based on an assumption that the vehicle V is an electric vehicle (EV) or a hybrid electric vehicle (HEV).

Structure of Vehicle V

The vehicle V is, for example, an electric vehicle having a power unit 20, serving as a drive source. The vehicle V may be, for example, a hybrid electric vehicle having multiple drive sources including an engine and the power unit 20.

In the vehicle V, a vehicle front chamber FA (hereinbelow, a front chamber FA) is provided in front of a cabin CA, serving as a compartment for occupants.

As illustrated in FIG. 1, the front chamber FA includes front wheels 10, the power unit 20, an inverter unit 30, a toe board 40, strut towers 50, a torque box 60, side sills 70, and the front part structure S (a dot-hatched part surrounded by a two-dot chain line in FIG. 1).

The power unit 20 is a drive device including a vehicle driving motor (not illustrated) for driving the front wheels 10, a transmission, a clutch, and a drive shaft. The power unit 20 is installed in a space surrounded by front side frames 110 (described below), a front cross member 120 (described below), the toe board 40, and the torque box 60, and is fixed in a state of being disposed on the upper surfaces of the front side frames 110.

The inverter unit 30 is disposed on and fixed to the upper side of the power unit 20. The inverter unit 30 generates a voltage to be supplied to the vehicle driving motor.

The inverter unit 30 is capable of outputting a high voltage to be supplied to the power unit 20 and generates a voltage necessary for driving the power unit 20.

The power unit 20 and the inverter unit 30 are installed in a space surrounded by a robust frame.

The front part structure S is provided in front of the power unit 20 and the inverter unit 30, and the power unit 20 and the inverter unit 30 are provided between the strut towers 50 in the vehicle width direction. The toe board 40, the torque box 60, and the side sills 70 are provided behind the power unit 20 and the inverter unit 30.

The toe board 40 is provided in front of the cabin CA so as to stand upright in the vehicle vertical direction to divide between the front chamber FA and the cabin CA. The toe board 40 is joined to the upper side of the torque box 60 and to the rear ends of the front side frames 110 by welding or the like.

The strut towers 50 are supports on the vehicle body side to which suspensions are attached, and are provided on both sides in the vehicle width direction, in front of the toe board 40. The strut towers 50 are frameworks inclined inward in the vehicle width direction from the upper side to the lower side thereof, and are formed of, for example, high rigidity metal.

The strut towers 50 are joined to upper frame reinforcing members 130 (described below) at the upper outer sides thereof and are joined to the front side frames 110 at the lower inner sides thereof.

The torque box 60 is a member disposed between the front side frames 110 and the side sills 70 (described below) to couple the front side frames 110 and the side sills 70 to each other.

The torque box 60 is a framework extending in the vehicle width direction at the bottom of the vehicle V, and the right and left front side frames 110 are joined, at one end thereof, to the torque box 60 by welding or the like. The torque box 60 is formed of, for example, high rigidity metal, and has a closed substantially rectangular cross-section.

The side sills 70 are provided at side bottom surfaces of the vehicle, on both sides in the vehicle width direction, behind the toe board 40. The side sills 70 are frameworks extending in the vehicle longitudinal direction, are formed of, for example, high rigidity metal, and have a closed substantially rectangular cross-section.

The front part structure S is provided inside the front chamber FA in front of the toe board 40.

Hereinbelow, the structure of the front part structure S will be described.

Structure of Front Part Structure S

The front part structure S is bilaterally symmetrical in the vehicle width direction.

Figures 2A, 2B, 2C:
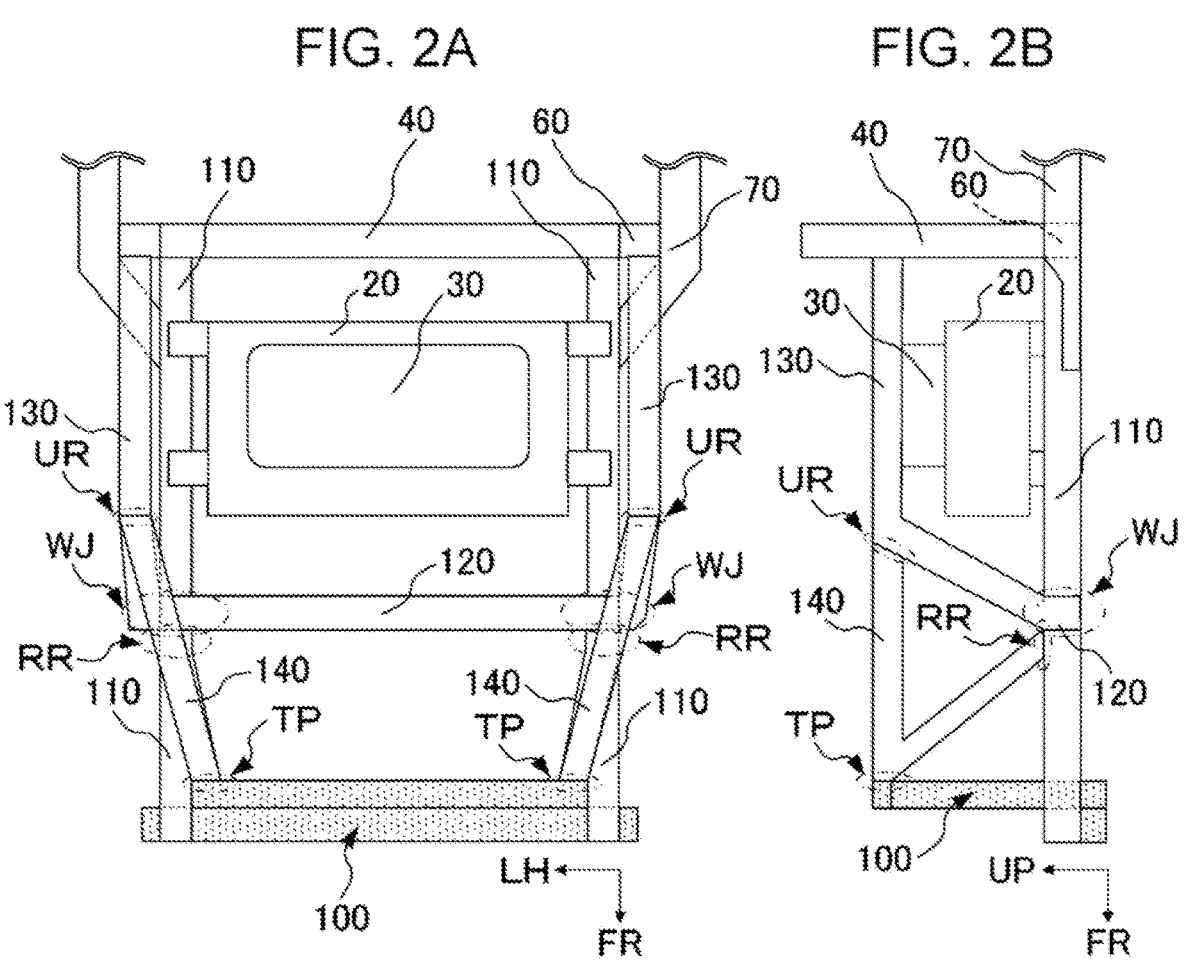

As illustrated in FIGS. 2A to 2C, the front part structure S includes a radiator panel frame 100, the front side frames 110, the front cross member 120, the upper frame reinforcing members 130, and radiator panel reinforcing members 140.

Radiator Panel Frame 100

As indicated by dot hatching in FIGS. 2A to 2C, the radiator panel frame 100 is a framework extending in the vehicle width direction and the vehicle vertical direction at the front side of the vehicle V.

As illustrated in FIG. 2C, the radiator panel frame 100 is formed by joining frames, which are formed of, for example, metal and have a closed substantially rectangular cross-section, in a substantially rectangular shape as viewed from the vehicle traveling direction, such that the long sides extend in the vehicle width direction and the short sides extend in the vehicle vertical direction.

The ends of the lower side member of the radiator panel frame 100 protrude outward in the vehicle width direction. The front side frames 110 are joined to the upper side of the protruding ends of the lower side member of the radiator panel frame 100.

The radiator panel reinforcing members 140 are joined to the ends of the upper side of the radiator panel frame 100.

Front Side Frames 110

The front side frames 110 are provided in a pair and extend in the vehicle longitudinal direction on both sides of the power unit 20 in the vehicle width direction, below the power unit 20. The front ends of the front side frames 110 are joined to the outside parts of the radiator panel frame 100 in the vehicle width direction. The rear ends of the front side frames 110 are joined to the toe board 40 by welding or the like.

The front side frames 110 are formed of, for example, high rigidity metal and have a closed substantially rectangular cross-section.

Front Cross Member 120

The front cross member 120 extends in the vehicle width direction in front of the inverter unit 30 and is joined to the front side frames 110 at the ends thereof in the vehicle width direction.

The front cross member 120 is formed of, for example, metal and has a closed substantially rectangular cross-section. The front side frames 110 and the front cross member 120 are firmly joined together by welding or the like at joint parts WJ.

Upper Frame Reinforcing Members 130

The upper frame reinforcing members 130 extend in the vehicle longitudinal direction, on both sides in the vehicle width direction, on the upper side of the vehicle, from the upper part of the toe board 40 in front of the cabin CA.

The upper frame reinforcing members 130 have bent parts bent downward toward the front side of the vehicle at positions behind the front cross member 120 and are joined to the outside parts of the joint parts WJ in the vehicle width direction, at the lower front ends thereof. The rear ends of the upper frame reinforcing members 130 are joined to the upper parts of the toe board 40 and the strut towers 50.

The radiator panel reinforcing members 140 are joined to the front side parts of the bent parts of the upper frame reinforcing members 130.

The upper frame reinforcing members 130 are formed of, for example, metal and have a closed substantially rectangular cross-section.

Radiator Panel Reinforcing Members 140

As illustrated in FIG. 2B, the radiator panel reinforcing members 140 each have an upper side member and a lower side member joined together at an apex TP to form a V shape pointing in the vehicle longitudinal direction. The apex TP is disposed on the front side of the vehicle.

The radiator panel reinforcing members 140 constitute V-shaped rigid frameworks.

For example, in the upper side members of the radiator panel reinforcing members 140, the apexes TP are joined to the outer parts, in the vehicle width direction, of the upper end of the radiator panel frame 100, and rear ends UR of the upper side members are joined to the front side parts of the bent parts of the upper frame reinforcing members 130.

In the lower side members of the radiator panel reinforcing members 140, rear ends RR are joined to the upper surfaces of the front side frames 110, in front of the joint parts WJ.

As illustrated in FIGS. 2A and 2C, as viewed from the vehicle traveling direction, the apexes TP are located on the more inner side than the rear ends UR of the upper side members and the rear ends RR of the lower side members in the vehicle width direction.

Furthermore, as viewed from the vehicle traveling direction, the rear ends RR of the lower side members are located on the more inner side than the rear ends UR of the upper side members in the vehicle width direction.

Hence, as illustrated in FIG. 2A, the upper side members and the lower side members extend inward in the vehicle width direction, from the rear side toward the front side of the vehicle V.

The radiator panel reinforcing members 140 are formed of, for example, metal and have a closed substantially rectangular cross-section.

The front part structure S is a robust three-dimensional framework formed by joining together the radiator panel frame 100, the front side frames 110, the front cross member 120, the upper frame reinforcing members 130, and the radiator panel reinforcing members 140.

In the front part structure S, the toe board 40, the strut towers 50, the torque box 60, and the side sills 70 are joined together to form the robust front chamber FA.

Operation

Hereinbelow, the operation of the thus-configured front part structure S according to this embodiment when an object collides head-on with the vehicle V will be described.

Figure 3A:
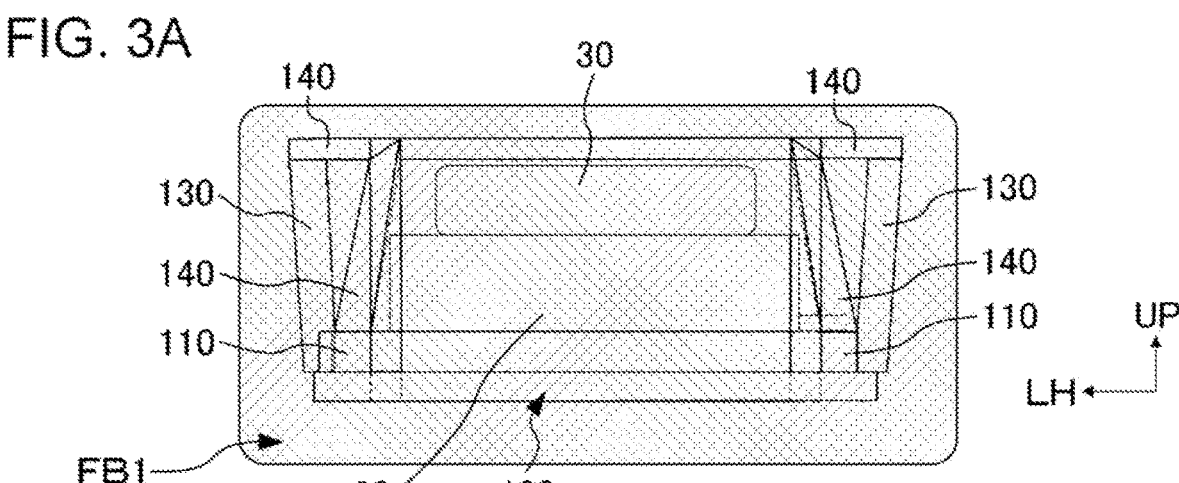

As illustrated in FIG. 3A, in a full-overlap collision, in which an object FB1, indicated with hatching, collides with the vehicle V from the vehicle traveling direction, the object FB1 collides with the front side of the vehicle V.

Figure 3B:
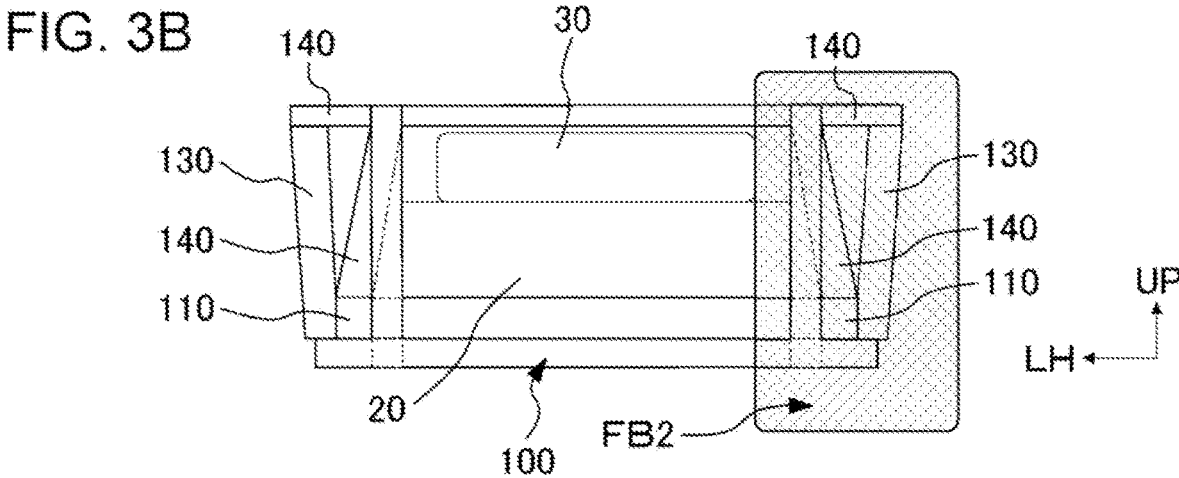

As illustrated in FIG. 3B, in a small-overlap collision, in which an object FB2, indicated with hatching, collides with the vehicle V from the vehicle traveling direction, the object FB2 collides with the right or left outer side, in the vehicle width direction, of the front part of the vehicle V.

Figure 3C:
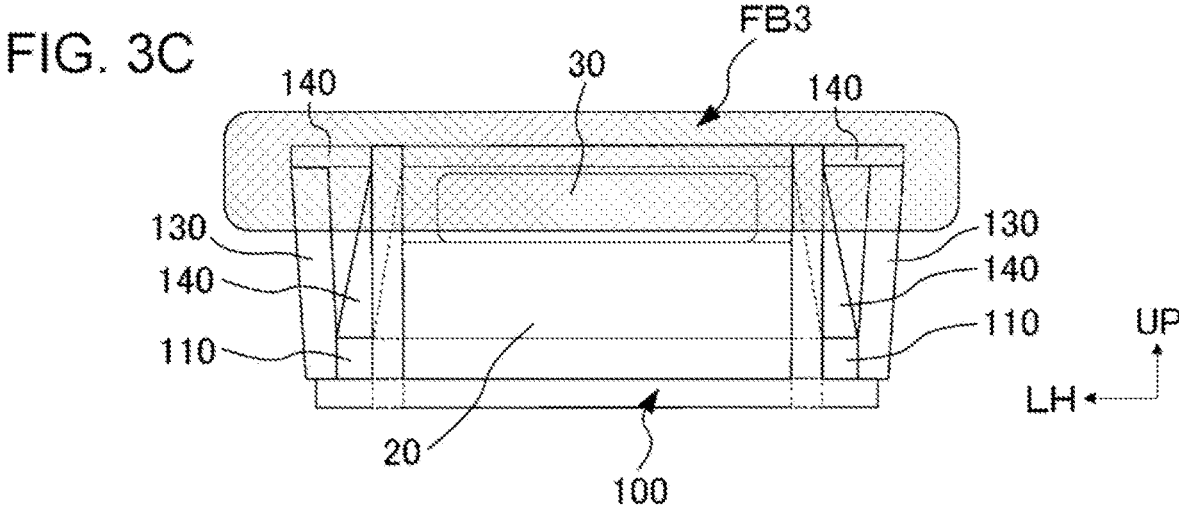

As illustrated in FIG. 3C, in an under-ride collision, in which an object FB3, indicated with hatching, collides with the vehicle V from the vehicle traveling direction, the object FB3 collides with the upper side of the vehicle V.

Full-Overlap Collision

Figure 4:
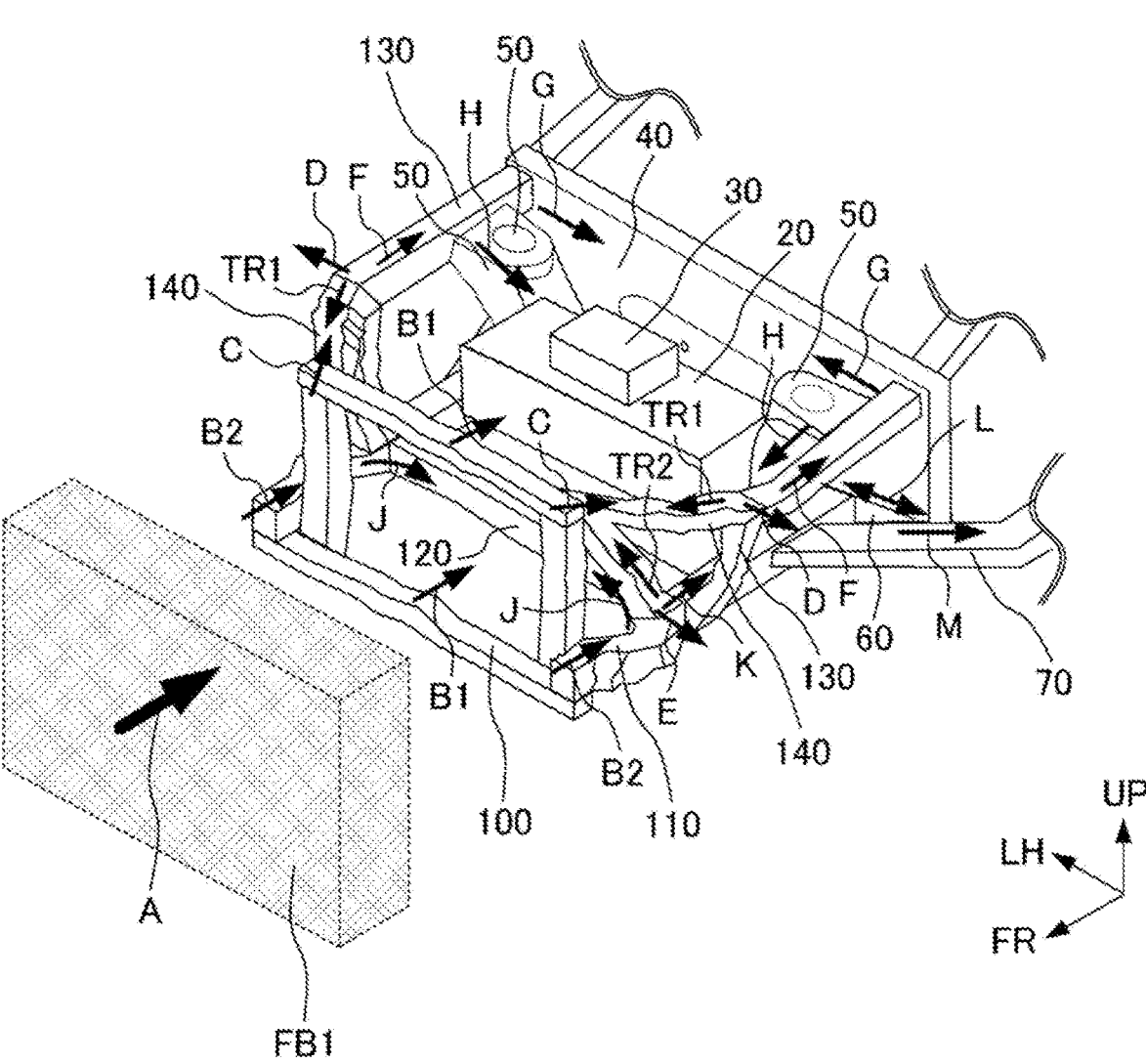
FIG. 4 is a perspective view, as viewed from above, illustrating deformation of the vehicle body front part structure according to the embodiment of the disclosure at the time of a full-overlap collision.

As illustrated in FIG. 4, in a full-overlap collision, in which the object FB1 collides with the vehicle V from the vehicle traveling direction, the object FB1 collides with the front side of the vehicle V.

In the full-overlap collision, the object FB1 collides with the vehicle V from the vehicle traveling direction, generating collision energy in the direction of arrow A.

The collision energy generated by the object FB1 is transmitted to the rear side of the vehicle via the radiator panel frame 100, as indicated by arrows B1.

The collision energy indicated by arrows B2, directed from the front side to the rear side of the vehicle, is transmitted to the front side frames 110. The front ends of the front side frames 110 are crushed by the collision energy, and the collision energy is absorbed by deformation of the front ends of the front side frames 110.

The collision energy indicated by arrows C, directed from the front side to the rear side of the vehicle, is transmitted to the radiator panel reinforcing members 140. The upper side members and the lower side members of the radiator panel reinforcing members 140 are crushed by the collision energy.

The upper side members of the radiator panel reinforcing members 140 are joined to the bent parts of the upper frame reinforcing members 130, and the lower side members of the radiator panel reinforcing members 140 are joined to the upper surfaces of the front side frames 110, in front of the joint parts WJ. In other words, the radiator panel reinforcing members 140 and the upper frame reinforcing members 130 form robust V-shaped frameworks. Hence, the collision energy transmitted to the radiator panel reinforcing members 140 is absorbed by crushing of the radiator panel reinforcing members 140 and reaction forces, indicated by arrows TR1 and TR2, generated from the robust V-shaped frameworks.

Furthermore, when the collision energy is transmitted to the radiator panel reinforcing members 140, because the apexes TP are located on the more inner side than the rear ends UR and the rear ends RR in the vehicle width direction, the rear ends UR and the rear ends RR deform so as to be pushed outward in the vehicle width direction, as indicated by arrows D and E. Thus, the collision energy is absorbed by crushing and deformation of the radiator panel reinforcing members 140.

Furthermore, the collision energy indicated by arrows F, transmitted from the rear ends UR of the radiator panel reinforcing members 140 to the upper frame reinforcing members 130, is transmitted to and distributed between the toe board 40 and the strut towers 50, as indicated by arrows G and H.

Furthermore, the collision energy transmitted from the front side frames 110 and the collision energy transmitted from the rear ends RR of the radiator panel reinforcing members 140 are transmitted to the joint parts WJ, where the front cross member 120 and the front side frames 110 are joined.

The collision energy transmitted to the joint parts WJ is distributed between the front cross member 120, as indicated by arrows J, and the front side frames 110, as indicated by arrow K.

Furthermore, as a result of the radiator panel reinforcing members 140 deforming outward in the vehicle width direction at the joint parts WJ, the collision energy is transmitted so as to rotate outward in the vehicle width direction, as indicated by arrow E, and is absorbed by the front cross member 120.

The energy distributed and transmitted to the front side frames 110 is distributed among and absorbed by the toe board 40, the torque box 60, and the side sills 70, as indicated by arrows G, L, and M, respectively.

As described above, the collision energy is absorbed by crushing and deformation of the front part structure S, which includes the radiator panel frame 100, the front side frames 110, the front cross member 120, the upper frame reinforcing members 130, and the radiator panel reinforcing members 140.

Furthermore, the collision energy is distributed in and absorbed by the front chamber FA, which includes the front side frames 110, the front cross member 120, the toe board 40, the strut towers 50, the torque box 60, and the side sills 70.

Hence, the inverter unit 30, which is disposed between, in the vehicle width direction, the front side frames 110 and the upper frame reinforcing members 130 extending in the vehicle longitudinal direction on both sides in the vehicle width direction and behind the front cross member 120, is not deformed.

Absorption of the collision energy by the deformation of the front part structure S ends with the end of input of the collision energy.

Small-Overlap Collision

Figure 5:
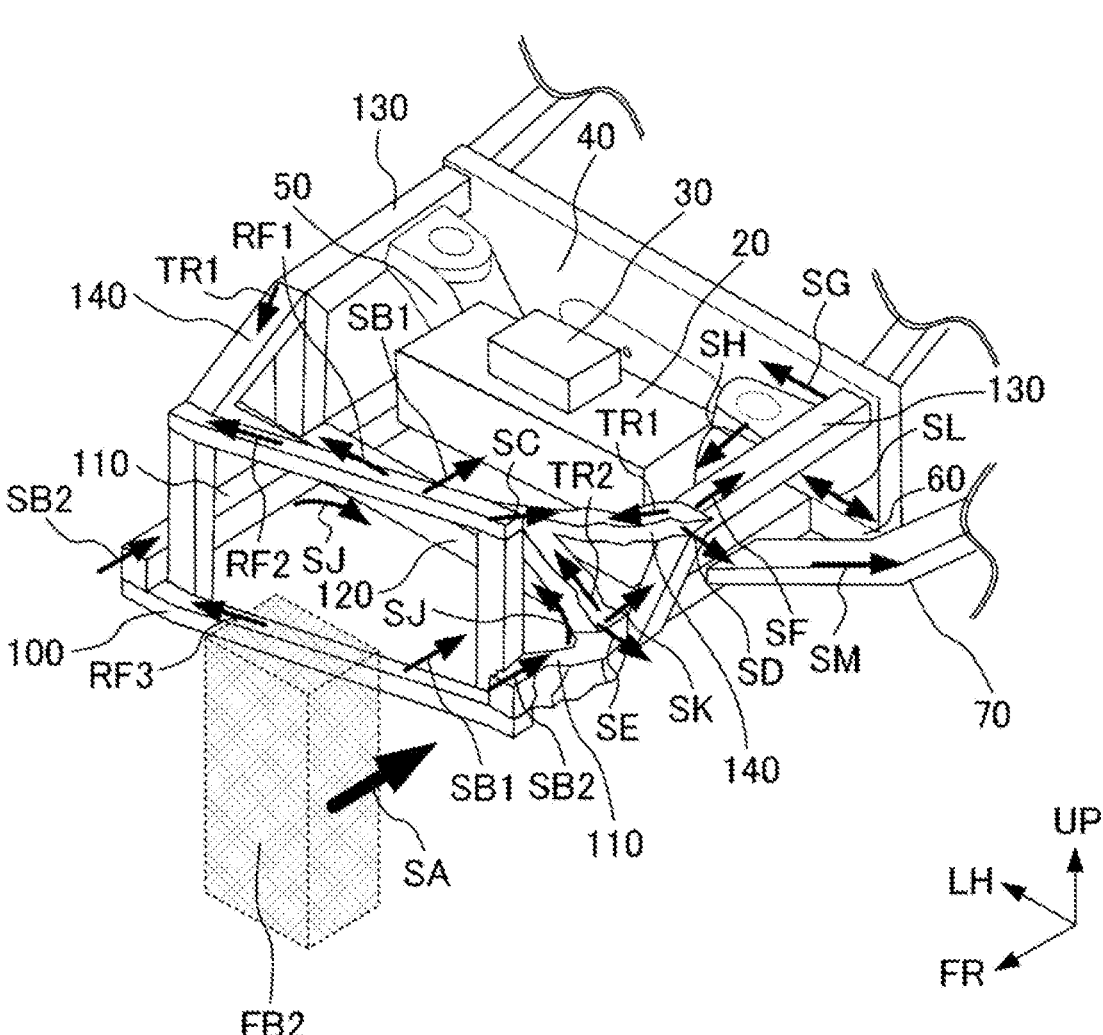
FIG. 5 is a perspective view, as viewed from above, illustrating deformation of the vehicle body front part structure according to the embodiment of the disclosure at the time of a small-overlap collision.

As illustrated in FIG. 5, in a small-overlap collision, in which an object FB2 collides with the vehicle V from the vehicle traveling direction, the object FB2 collides with the outer right or left front side of the vehicle V, generating collision energy in the direction of arrow SA.

Hereinbelow, the case where the object FB2 collides with the right side of the vehicle V, as viewed from the vehicle traveling direction, will be described.

When the object FB2 collides head-on with the vehicle V, collision energy is generated in the direction of arrow SA.

The collision energy generated by the object FB2 is transmitted to the rear side of the vehicle via the radiator panel frame 100, as indicated by arrow SB1.

The collision energy indicated by arrows SB2, directed from the front side to the rear side of the vehicle, is transmitted to the front side frames 110. The front end of the front side frame 110 is crushed by the collision energy, and the collision energy is absorbed by deformation of the front end of the front side frame 110.

The collision energy indicated by arrow SC, directed from the front side to the rear side of the vehicle, is transmitted to the radiator panel reinforcing member 140. The upper side member and the lower side member of the radiator panel reinforcing member 140 are crushed by the collision energy.

The collision energy transmitted to the radiator panel reinforcing member 140 is absorbed by crushing of the radiator panel reinforcing member 140 and reaction forces, indicated by arrows TR1 and TR2, generated from the robust V-shaped framework.

Furthermore, reaction forces indicated by arrows RF1 to RF3 are generated from the radiator panel frame 100 and the joint part WJ on the non-collided side. Hence, the collision energy transmitted to the joint part WJ on the collided side is cancelled by the reaction forces transmitted via the radiator panel frame 100 and the front cross member 120 and is absorbed.

Furthermore, when the collision energy is transmitted to the radiator panel reinforcing member 140, the rear end UR and the rear end RR thereof deform so as to be pushed outward in the vehicle width direction, as indicated by arrows SD and SE. Thus, the collision energy is absorbed by crushing and deformation of the radiator panel reinforcing member 140.

The collision energy transmitted from the rear end UR of the radiator panel reinforcing member 140 to the upper frame reinforcing member 130, as indicated by arrow SF, is transmitted to and distributed between the toe board 40 and the strut tower 50, as indicated by arrows SG and SH.

Furthermore, the collision energy transmitted from the front side frame 110 and the collision energy transmitted from the rear end RR of the radiator panel reinforcing member 140 are transmitted to the joint part WJ, where the front cross member 120 and the front side frame 110 are joined.

The collision energy transmitted to the joint part WJ is distributed between the front cross member 120, as indicated by arrow SJ, and the front side frame 110, as indicated by arrow SK.

The energy distributed and transmitted to the front side frame 110 is distributed among and absorbed by the toe board 40, the torque box 60, and the side sill 70, as indicated by arrows SG, SL, and SM, respectively.

Furthermore, as a result of the radiator panel reinforcing member 140 deforming outward in the vehicle width direction at the joint part WJ, the collision energy is transmitted so as to rotate outward in the vehicle width direction, as indicated by arrow SE, and is absorbed.

As described above, the collision energy is absorbed by crushing and deformation of the collided side of the front part structure S, which includes the radiator panel frame 100, the front side frames 110, the front cross member 120, the upper frame reinforcing members 130, and the radiator panel reinforcing members 140.

Furthermore, the collision energy is distributed in and absorbed by the front chamber FA, which includes the front side frames 110, the front cross member 120, the toe board 40, the strut towers 50, the torque box 60, and the side sills 70.

Hence, the inverter unit 30, which is disposed between, in the vehicle width direction, the front side frames 110 and the upper frame reinforcing members 130 extending in the vehicle longitudinal direction on both sides in the vehicle width direction and behind the front cross member 120, is not deformed.

Under-Ride Collision

Figure 6:
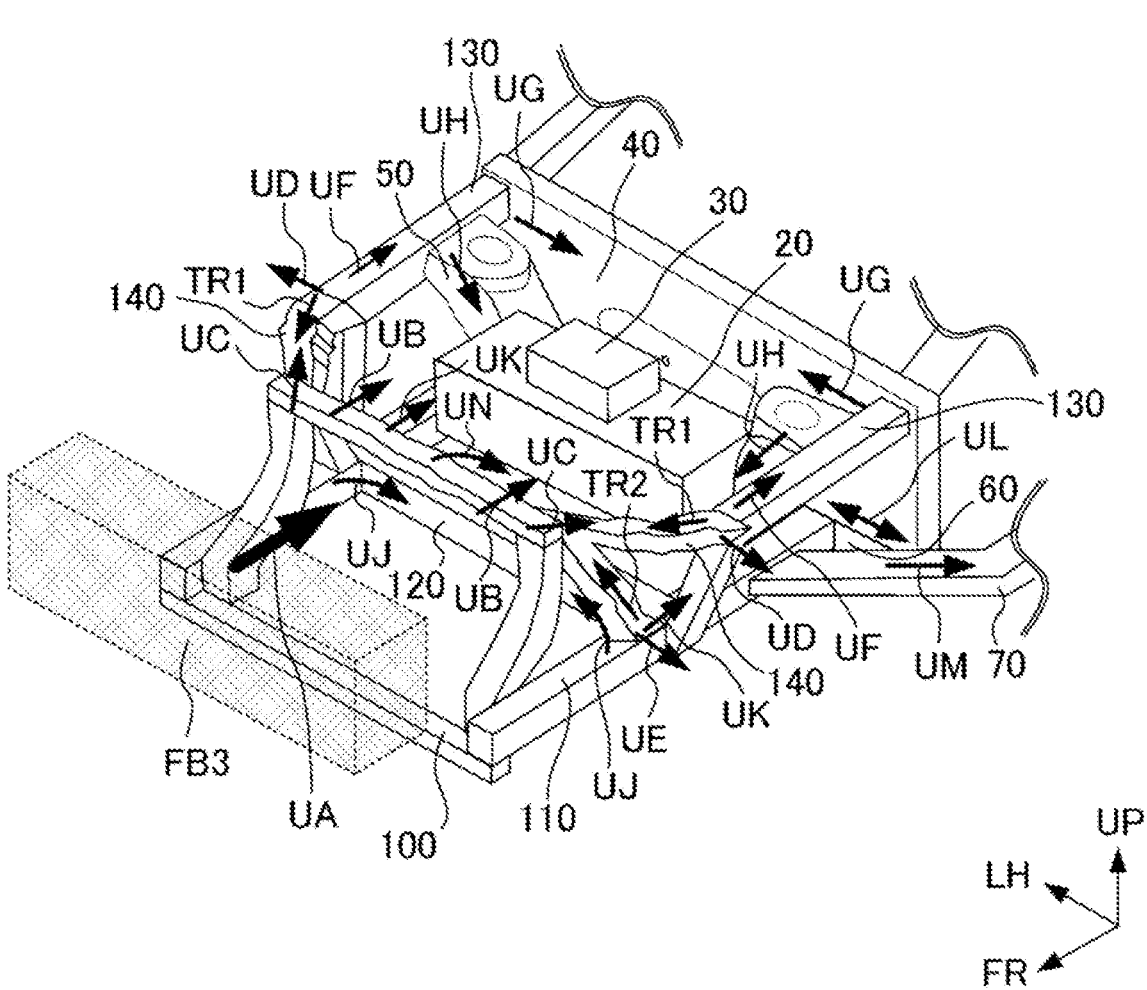
FIG. 6 is a perspective view, as viewed from above, illustrating deformation of the vehicle body front part structure according to the embodiment of the disclosure at the time of an under-ride collision.

As illustrated in FIG. 6, in an under-ride collision, the object FB3 collides with the upper part of the vehicle V, generating collision energy in the direction of arrow UA. When the object FB3 collides head-on with the vehicle V, collision energy is generated in the direction of arrow UA.

The collision energy generated by the object FB3 is transmitted to the rear side of the vehicle via the upper side of the radiator panel frame 100, as indicated by arrows UB.

The radiator panel frame 100 falls backward, as indicated by arrow UN, so as to rotate about the lower side member of the radiator panel frame 100.

The collision energy indicated by arrows UC, directed from the front side to the rear side of the vehicle, is transmitted to the radiator panel reinforcing members 140. The upper side members and the lower side members of the radiator panel reinforcing members 140 are crushed by the collision energy.

The collision energy transmitted to the radiator panel reinforcing members 140 is absorbed by crushing of the radiator panel reinforcing members 140 and reaction forces, indicated by arrows TR1 and TR2, generated from the robust V-shaped frameworks. Thus, the radiator panel frame 100 is restricted from falling backward.

Furthermore, when the collision energy is transmitted to the radiator panel reinforcing members 140, the rear ends UR and the rear ends RR thereof deform so as to be pushed outward in the vehicle width direction, as indicated by arrows UD and UE. Thus, the collision energy is absorbed by crushing and deformation of the radiator panel reinforcing members 140.

The collision energy transmitted from the rear ends UR of the radiator panel reinforcing members 140 to the upper frame reinforcing members 130, as indicated by arrows UF, is transmitted to and distributed between the toe board 40 and the strut towers 50, as indicated by arrows UG and UH.

Furthermore, the collision energy transmitted to the radiator panel reinforcing members 140 is distributed between the front side frames 110 and the front cross member 120 via the rear ends RR, as indicated by arrows UK and UJ.

The energy distributed and transmitted to the front side frames 110 is distributed among and absorbed by the toe board 40, the torque box 60, and the side sills 70, as indicated by arrows UG, UL, and UM, respectively.

As described above, the collision energy is absorbed by crushing and deformation of the front part structure S, which includes the radiator panel frame 100, the front side frames 110, the front cross member 120, the upper frame reinforcing members 130, and the radiator panel reinforcing members 140.

Furthermore, the collision energy is distributed in and absorbed by the front chamber FA, which includes the front side frames 110, the front cross member 120, the toe board 40, the strut towers 50, the torque box 60, and the side sills 70.

Hence, the inverter unit 30, which is disposed between, in the vehicle width direction, the front side frames 110 and the upper frame reinforcing members 130 extending in the vehicle longitudinal direction on both sides in the vehicle width direction and behind the front cross member 120, is not deformed.

Absorption of the collision energy by the deformation of the front part structure S ends with the end of input of the collision energy.

As described above, the vehicle body front part structure S is provided in front of the cabin CA for occupants. The vehicle body front part structure S includes: the radiator panel frame 100 formed in a rectangular shape having long sides extending in the vehicle width direction and short sides extending in the vehicle vertical direction at the front side of the vehicle; the pair of front side frames 110 extending in the vehicle longitudinal direction, on both sides in the vehicle width direction, on the lower side of the vehicle, and joined to the outside parts, in the vehicle width direction, of the radiator panel frame 100 at the front ends thereof; the inverter unit 30 disposed on the front side frames 110 and configured to generate a voltage to be supplied to a vehicle driving motor; the front cross member 120 extending in the vehicle width direction in front of the inverter unit 30 and joined to the front side frames 110; the pair of upper frame reinforcing members 130 extending from the front side of the cabin CA in the vehicle longitudinal direction, on both sides in the vehicle width direction, on the upper side of the vehicle, having bent parts bent downward toward the front side of the vehicle at positions behind the front cross member 120, and joined to the outside parts, in the vehicle width direction, of the joint parts WJ between the front side frames 110 and the front cross member 120 at the lower front ends thereof; and the radiator panel reinforcing members 140 whose apexes TP are disposed on the front side of the vehicle. The upper side members and the lower side members of the radiator panel reinforcing members 140 form a V shape pointing in the vehicle longitudinal direction. The apexes TP where the upper side members and the lower side members are joined to each other are joined to the outer parts, in the vehicle width direction, of the upper end of the radiator panel frame 100. The rear ends of the upper side members are joined to the front side parts of the bent parts of the upper frame reinforcing members 130. The rear ends of the lower side members are joined to the upper surfaces of the front side frames 110, at positions in front of the joint parts WJ between the front cross member 120 and the front side frames 110.

In full-overlap and small-overlap collisions, the collision energy directed to the rear side of the vehicle is transmitted to the radiator panel frame 100. The collision energy is absorbed by crushing and deformation of the front part structure S, which includes the radiator panel frame 100, the front side frames 110, the front cross member 120, the upper frame reinforcing members 130, and the radiator panel reinforcing members 140. The robust V-shaped frameworks provided by the radiator panel reinforcing members 140 restrict backward deformation of the front part structure S. Hence, in the front part structure S, backward deformation of the front cross member 120 is restricted.

In an under-ride collision, the collision energy directed to the rear side of the vehicle is transmitted via the upper side of the radiator panel frame 100. The collision energy is absorbed by crushing and deformation of the front part structure S, which includes the radiator panel frame 100, the upper frame reinforcing members 130, and the radiator panel reinforcing members 140. The robust V-shaped frameworks provided by the radiator panel reinforcing members 140 allow the front part structure S to deform outward in the vehicle width direction, while restricting the front part structure S from falling backward. Hence, in the front part structure S, backward deformation of the front cross member 120 is restricted.

Furthermore, in full-overlap, small-overlap, and under-ride collisions, the collision energy is distributed in and absorbed by the front chamber FA, which includes the front side frames 110, the front cross member 120, the toe board 40, the strut towers 50, the torque box 60, and the side sills 70.

In other words, in full-overlap, small-overlap, and under-ride collisions, the collision energy is absorbed by crushing and deformation of the radiator panel frame 100, the upper frame reinforcing members 130, and the front side frames 110, and the reaction forces generated therefrom. Thus, it is possible to absorb the collision energy without deforming the inverter unit 30, which is disposed on the inner side of the front part structure S in the vehicle width direction and behind the front cross member 120.

Hence, it is possible to prevent deformation of the inverter unit 30 in multiple types of frontal collision.

In the front part structure S according to this embodiment, the apexes TP of the radiator panel reinforcing members 140 are located on the more inner side than the rear ends UR of the upper side members and the rear ends RR of the lower side members in the vehicle width direction, as viewed from the vehicle traveling direction.

That is, in the radiator panel reinforcing members 140, the apexes TP are located on the most inner side in the vehicle width direction, as viewed from the vehicle traveling direction, among the apexes TP, the rear ends UR, and the rear ends RR. Hence, when a collision occurs from the vehicle traveling direction, the radiator panel reinforcing members 140 can be deformed outward in the vehicle width direction. Thus, it is possible to absorb the collision energy without deforming the inverter unit 30, which is disposed on the inner side of the front part structure S in the vehicle width direction and behind the front cross member 120.

Hence, it is possible to prevent deformation of the inverter unit 30 in multiple types of frontal collision.

Although the embodiment of the disclosure has been described in detail above with reference to the drawings, the structure of the disclosure is not limited to one described above, and designs and the like within a scope not departing from the gist of the disclosure are also included.

The invention claimed is:

1. A vehicle body front part structure provided in front of a cabin configured to accommodate one or more occupants in a vehicle, the vehicle body front part structure comprising:

a radiator panel frame forming a framework extending in a vehicle width direction and a vehicle vertical direction of the vehicle at a front side of the vehicle;

front side frames in a pair, the front side frames extending in a vehicle longitudinal direction of the vehicle, on both sides in the vehicle width direction, on a lower side of the vehicle, and each comprising a front end joined to the radiator panel frame;

an inverter unit disposed between the front side frames in the vehicle width direction and configured to generate a voltage to be supplied to a vehicle driving motor of the vehicle;

a front cross member extending in the vehicle width direction in front of the inverter unit and comprising both ends joined to the front side frames in the vehicle width direction;

upper frame reinforcing members in a pair, the upper frame reinforcing members extending in the vehicle longitudinal direction on both sides in the vehicle width direction on an upper side of the vehicle, each comprising a bent part bent downward toward the front side of the vehicle at a position behind the front cross member, and each comprising a lower front end joined to an outside part of a joint part in the vehicle width direction, the joint part joining the front cross member and a corresponding one of the front side frames; and radiator panel reinforcing members each comprising an upper side member and a lower side member that are joined together at an apex to form a V shape pointing in the vehicle longitudinal direction, the apex being disposed on the front side of the vehicle, an upper end of the radiator panel frame comprising an outer part joined to the apex in the vehicle width direction, a rear end of the upper side member being joined to a front side part of the bent part of a corresponding one of the upper frame reinforcing members, and a rear end of the lower side member joined to an upper surface of the corresponding one of the front side frames at a position in front of the joint part.

2. The vehicle body front part structure according to claim 1, wherein the apex of each of the radiator panel reinforcing members is located on a more inner side than the rear end of the upper side member and the rear end of the lower side member in the vehicle width direction, as viewed from a vehicle traveling direction of the vehicle.

3. The vehicle body front part structure according to claim 1, wherein, for each of the radiator panel reinforcing members, the rear end of the lower side member is located further inward in the vehicle width direction than the rear end of the upper side member.

4. The vehicle body front part structure according to claim 1, further comprising strut towers in a pair, each strut tower being joined to a corresponding one of the upper frame reinforcing members, wherein, for each of the radiator panel reinforcing members, the rear end of the upper side member is joined to the bent part of a corresponding one of the upper frame reinforcing members at a position in front of a corresponding one of the strut towers.

\* \* \* \* \*